United States Patent
Kawakami et al.

(10) Patent No.: US 8,597,830 B2
(45) Date of Patent: Dec. 3, 2013

(54) POWER STORAGE DEVICE

(75) Inventors: Takahiro Kawakami, Kanagawa (JP);
Masaki Yamakaji, Kanagawa (JP);
Nadine Takahashi, Kanagawa (JP);
Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 155 days.

(21) Appl. No.: 13/113,189

(22) Filed: May 23, 2011

(65) Prior Publication Data
US 2011/0294009 A1 Dec. 1, 2011

(30) Foreign Application Priority Data
May 28, 2010 (JP) ................................. 2010-122793

(51) Int. Cl.
*H01M 4/13* (2010.01)
(52) U.S. Cl.
USPC ........ 429/218.1; 429/211; 429/221; 429/223; 429/224; 429/178; 429/188
(58) Field of Classification Search
USPC ............... 429/211, 221, 223, 224, 178, 188, 429/218.1
See application file for complete search history.

(56) References Cited

U.S. PATENT DOCUMENTS

| | | | |
|---|---|---|---|
| 6,514,640 B1 * | 2/2003 | Armand et al. | 429/231.1 |
| 7,638,236 B2 * | 12/2009 | Ugaji et al. | 429/231.1 |
| 7,718,314 B2 | 5/2010 | Komiyama et al. | |
| 2004/0096743 A1 | 5/2004 | Okae et al. | |
| 2007/0292759 A1 * | 12/2007 | Ugaji et al. | 429/223 |
| 2008/0248382 A1 | 10/2008 | Sastry et al. | |
| 2008/0268339 A1 | 10/2008 | Suzuki | |

(Continued)

FOREIGN PATENT DOCUMENTS

| | | |
|---|---|---|
| JP | 11-025983 | 1/1999 |
| JP | 11-067209 | 3/1999 |

(Continued)

OTHER PUBLICATIONS

Zhou, et al., "The Li Intercalation Potential of $LiMPO_4$ and $LiMSiO_4$ Olivines with M=Fe, Mn, Co, Ni", Electrochemistry Communications, Nov. 1, 2004, vol. 6, No. 11, pp. 1144-1148.

(Continued)

*Primary Examiner* — Patrick Ryan
*Assistant Examiner* — Alex Usyatinsky
(74) *Attorney, Agent, or Firm* — Nixon Peabody LLP; Jeffrey L. Costellia

(57) ABSTRACT

An object is to provide a power storage device with high discharge capacity and high energy density. The power storage device includes a positive electrode in which a positive electrode active material is formed over a positive electrode current collector; and a negative electrode which faces the positive electrode with an electrolyte interposed therebetween. The positive electrode active material includes a film-form first region which includes a compound containing lithium and nickel; and a film-form second region which includes a compound containing lithium and one or more of iron, manganese, and cobalt, but not containing nickel. The first region is covered with the second region. Since a superficial portion of the positive electrode active material does not contain nickel, nickel is not in contact with an electrolyte solution; thus, generation of a catalyst effect of nickel can be suppressed, and a high discharge potential of nickel can be utilized.

10 Claims, 10 Drawing Sheets

(56) References Cited

U.S. PATENT DOCUMENTS

| | | |
|---|---|---|
| 2010/0163790 A1 | 7/2010 | Ceder et al. |
| 2011/0269023 A1 | 11/2011 | Kawakami et al. |
| 2011/0300441 A1 | 12/2011 | Kawakami |

FOREIGN PATENT DOCUMENTS

| | | |
|---|---|---|
| JP | 2002-075368 | 3/2002 |
| JP | 2003-157843 | 5/2003 |
| JP | 2004-087299 | 3/2004 |
| JP | 2007-103339 | 4/2007 |
| JP | 2010-517240 | 5/2010 |
| JP | 2010-524158 | 7/2010 |
| WO | WO-2006/027925 A2 | 3/2006 |
| WO | WO 2008/091707 * | 7/2008 |

OTHER PUBLICATIONS

Kang, et al., "Battery Materials for Ultrafast Charging and Discharging", Nature, Mar. 12, 2009, vol. 458, No. 12, pp. 190-193.

* cited by examiner

POWER STORAGE DEVICE

BACKGROUND OF THE INVENTION

1. Field of the Invention

One embodiment of the disclosed invention relates to a power storage device.

2. Description of the Related Art

The field of portable electronic devices such as personal computers and cellular phones has progressed significantly. The portable electronic device needs a chargeable power storage device having high energy density, which is small, lightweight, and reliable. As such a power storage device, for example, a lithium-ion secondary battery is known. In addition, development of electrically propelled vehicles on which secondary batteries are mounted has also been progressing rapidly from a rise of growing awareness to environmental problems and energy problems.

In a lithium-ion secondary battery, as a positive electrode active material, a phosphate compound having an olivine structure and containing lithium (Li) and iron (Fe), cobalt (Co), or nickel (Ni), such as lithium iron phosphate ($LiFePO_4$), lithium cobalt phosphate ($LiCoPO_4$), or lithium nickel phosphate ($LiNiPO_4$), has been known (see Patent Document 1, Non-Patent Document 1, and Non-Patent Document 2).

Lithium iron phosphate is expressed by a composition formula, $LiFePO_4$, and $FePO_4$ which is formed by completely extracting lithium from $LiFePO_4$ is also stable; thus, high capacity can be safely achieved with lithium iron phosphate.

REFERENCE

Patent Document

[Patent Document 1] Japanese Published Patent Application No. H11-25983

Non-Patent Document

[Non-Patent Document 1] Byoungwoo Kang, Gerbrand Ceder, "Nature", (United Kingdom of Great Britain and Northern Ireland), 2009, March, Vol. 458, pp. 190-193

[Non-Patent Document 2] F. Zhou et al., "Electrochemistry Communications", (Kingdom of the Netherlands), 2004, November, Vol. 6, No. 11, pp. 1144-1148

SUMMARY OF THE INVENTION

A positive electrode active material which includes a phosphate compound having an olivine structure and containing lithium and nickel described above is expected to have a higher discharge potential than a positive electrode active material which includes a phosphate compound having an olivine structure and containing lithium and iron, but not containing nickel. The theoretical capacity of a phosphate compound having an olivine structure and containing lithium and nickel (e.g., general formula: $LiNiPO_4$) and that of a phosphate compound having an olivine structure and containing lithium and iron, but not containing nickel (e.g., general formula: $LiFePO_4$) are almost the same. Accordingly, a positive electrode active material which includes a phosphate compound having an olivine structure and containing lithium and nickel is expected to have high energy density.

However, even when a positive electrode active material which includes a phosphate compound having an olivine structure and containing lithium and nickel is used, the expected potential has not been obtained. One reason of this is thought to be decomposition of an electrolyte solution (an organic solvent).

Nickel atoms included in a phosphate compound having an olivine structure and containing lithium and nickel, which is a positive electrode active material, might function as a catalyst for an oxidation-reduction reaction of an organic substance included in an electrolyte solution. Therefore, when a nickel metal or a nickel compound included in the positive electrode active material is in contact with the electrolyte solution, there is a possibility that an oxidation-reduction reaction of the organic substance included in the electrolyte solution is promoted and the organic substance is decomposed.

In view of the above problems, an object of one embodiment of the disclosed invention is to provide a power storage device having high energy density.

One embodiment of the present invention is a power storage device including a positive electrode in which a positive electrode active material is formed over a positive electrode current collector; and a negative electrode which faces the positive electrode with an electrolyte interposed between the negative electrode and the positive electrode. The positive electrode active material includes a film-form first region which includes a compound containing lithium (Li) and nickel (Ni); and a film-form second region which includes a compound containing lithium (Li) and one or more of iron (Fe), manganese (Mn), and cobalt (Co), but not containing nickel. The first region is covered with the second region.

The first region may include a phosphate compound containing lithium and nickel. The second region may include a phosphate compound containing lithium and one or more of iron, manganese, and cobalt, but not containing nickel. As a typical example of a phosphate compound, a phosphate compound having an olivine structure can be given. In the first region, the phosphate compound containing lithium and nickel may include a region having an olivine structure. In the second region, the phosphate compound containing lithium and one or more of iron, manganese, and cobalt, but not containing nickel, may include a region having an olivine structure. Further, both the first region and the second region may include a phosphate compound having an olivine structure. The structure of the first region may be a single crystal structure, a polycrystalline structure, a microcrystalline structure, or an amorphous structure. Further, the structure of the second region may be a single crystal structure, a polycrystalline structure, a microcrystalline structure, or an amorphous structure.

The first region which includes the phosphate compound having an olivine structure and containing lithium and nickel may be formed using a substance expressed by a general formula, $Li_{1-x1}Ni_yM_{1-y}PO_4$ (x1 is larger than or equal to 0 and smaller than or equal to 1; M is one or more of Fe, Mn, and Co; and y is larger than 0 and smaller than or equal to 1). The second region which includes the phosphate compound having an olivine structure and containing lithium and one or more of iron, manganese, and cobalt, but not containing nickel may be formed using a substance expressed by a general formula, $Li_{1-x2}MePO_4$ (x2 is larger than or equal to 0 and smaller than or equal to 1; and Me is one or more of Fe, Mn, and Co). M is one or more elements of Fe, Mn, and Co, and in addition, Me is one or more elements of Fe, Mn, and Co. In the case where M and Me are each two or more elements of Fe, Mn, and Co, there is no particular limitation on the ratio of the constituent elements.

The cases where, in the substance expressed by the general formula, $Li_{1-x1}Ni_yM_{1-y}PO_4$ (x1 is larger than or equal to 0 and smaller than or equal to 1; M is one or more of Fe, Mn, and Co; and y is larger than 0 and smaller than or equal to 1), M is one or more elements are described below.

In the case where M is one element of Fe, Mn, and Co, the substance included in the first region is expressed by a general formula, $Li_{1-x1}Ni_a(M1)_bPO_4$ (x1 is larger than or equal to 0 and smaller than or equal to 1; M1 is one of Fe, Mn, and Co; and a+b=1, a is larger than 0 and smaller than 1, and b is larger than 0 and smaller than 1).

In the case where M is two elements of Fe, Mn, and Co, the substance included in the first region is expressed by a general formula, $Li_{1-x1}Ni_a(M1)_b(M2)_cPO_4$ (x1 is larger than or equal to 0 and smaller than or equal to 1; M1≠M2, and M1 and M2 are each one of Fe, Mn, and Co; and a+b+c=1, a is larger than 0 and smaller than 1, b is larger than 0 and smaller than 1, and c is larger than 0 and smaller than 1).

In the case where M is three elements of Fe, Mn, and Co, the substance included in the first region is expressed by a general formula, $Li_{1-x1}Ni_a(M1)_b(M2)_c(M3)_dPO_4$ (x1 is larger than or equal to 0 and smaller than or equal to 1; M1≠M2, M1≠M3, M2≠M3, and M1, M2, and M3 are each one of Fe, Mn, and Co; and a+b+c+d=1, a is larger than 0 and smaller than 1, b is larger than 0 and smaller than 1, c is larger than 0 and smaller than 1, and d is larger than 0 and smaller than 1).

The cases where, in the substance expressed by the general formula, $Li_{1-x2}°MePO_4$ (x2 is larger than or equal to 0 and smaller than or equal to 1; and Me is one or more of Fe, Mn, and Co), Me is one or more elements are described below.

In the case where Me is one element of Fe, Mn, and Co, the substance included in the second region is expressed by a general formula, $Li_{1-x2}(Me1)PO_4$ (x2 is larger than or equal to 0 and smaller than or equal to 1; and Me1 is one of Fe, Mn, and Co).

In the case where Me is two elements of Fe, Mn, and Co, the substance included in the second region is expressed by a general formula, $Li_{1-x2}(Me1)_a(Me2)_bPO_4$ (x2 is larger than or equal to 0 and smaller than or equal to 1; Me1≠Me2, and Me1 and Me2 are each one of Fe, Mn, and Co; and a+b=1, a is larger than 0 and smaller than 1, and b is larger than 0 and smaller than 1).

In the case where Me is three elements of Fe, Mn, and Co, the substance included in the second region is expressed by a general formula, $Li_{1-x2}(Me1)_a(Me2)_b(Me3)_cPO_4$ (x2 is larger than or equal to 0 and smaller than or equal to 1; Me1≠Me2, Me2≠Me3, Me1≠Me3, and Me1, Me2 and Me3 are each one of Fe, Mn, and Co; and a+b+c=1, a is larger than 0 and smaller than 1, b is larger than 0 and smaller than 1, and c is larger than 0 and smaller than 1).

The substance expressed by the general formula, $Li_{1-x1}Ni_yM_{1-y}PO_4$ (x1 is larger than or equal to 0 and smaller than or equal to 1; M is one or more of Fe, Mn, and Co; and y is larger than 0 and smaller than or equal to 1), may have an olivine structure.

The substance expressed by the general formula, $Li_{1-x2}MePO_4$ (x2 is larger than or equal to 0 and smaller than or equal to 1; and Me is one or more of Fe, Mn, and Co), may have an olivine structure.

The first region may have a concentration gradient of nickel.

A positive electrode active material layer described later is formed of a film-form positive electrode active material.

According to one embodiment of the disclosed invention, a power storage device having high discharge voltage and high energy density can be obtained.

DETAILED DESCRIPTION OF THE INVENTION

Figure 1:
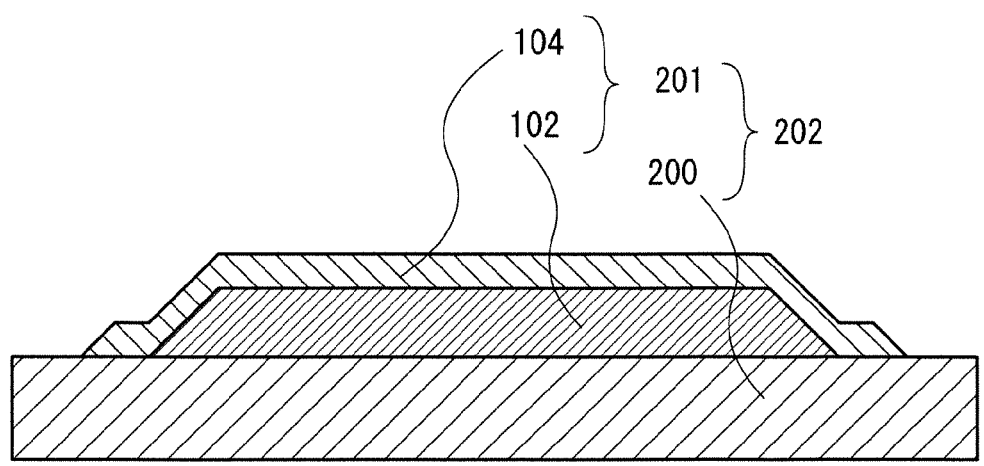
FIG. 1 illustrates one example of a cross-sectional view of a positive electrode including a positive electrode active material.

Hereinafter, embodiments of the present invention will be described with reference to the drawings. Note that the present invention is not limited to the following description. The present invention can be implemented in various different ways and it will be readily appreciated by those skilled in the art that various changes and modifications are possible without departing from the spirit and the scope of the present invention. Therefore, the present invention should not be construed as being limited to the following description of the embodiments. Note that reference numerals denoting the same portions are commonly used in different drawings.

Note that the size, the thickness of a layer, and a region of each structure illustrated in the drawings and the like in the embodiments are exaggerated for simplicity in some cases. Therefore, the scale of each structure is not necessarily limited to that illustrated in the drawings.

Note that ordinal numbers such as "first", "second", and "third" in this specification are used in order to identify components, and the terms do not limit the components numerically.

Embodiment 1

In this embodiment, a structure of a positive electrode included in a power storage device according to one embodiment of the present invention will be described with reference to FIG. 1.

FIG. 1 is a schematic cross-sectional view of a positive electrode included in a power storage device which is one embodiment of the present invention.

As illustrated in FIG. 1, in this embodiment, a positive electrode active material layer 201 includes a film-form first region which includes a compound containing lithium and nickel (hereinafter, this region is referred to as a first region 102); and a film-form second region which includes a compound containing lithium and one or more of iron, manganese, and cobalt, but not containing nickel (hereinafter, this region is referred to as a second region 104). The first region 102 is covered with the second region 104.

That is, a top surface and a side surface of the film-form first region 102 which includes the compound containing lithium and nickel are covered with the film-form second region 104 which includes the compound containing lithium and one or more of iron, manganese, and cobalt, but not containing nickel. Therefore, the surfaces of the first region 102 are not exposed. In the case where the positive electrode illustrated in FIG. 1 is used for a power storage device, a structure is employed in which the first region 102 is not in contact with an electrolyte solution. A surface of the positive electrode active material layer 201, which is in contact with the electrolyte solution, is formed of the second region 104.

The film-form first region 102 includes the compound containing lithium and nickel, and this nickel might function as a catalyst for an oxidation-reduction reaction of an organic substance included in the electrolyte solution. Therefore, when nickel in the first region 102 is in contact with the electrolyte solution, there is a possibility that an oxidation-reduction reaction of the organic substance included in the electrolyte solution is promoted and the organic substance is decomposed. According to this embodiment, nickel is not in contact with the electrolyte solution; thus, generation of a catalyst effect of nickel can be suppressed, and a high discharge potential of nickel can be utilized.

The first region 102 may be formed using a phosphate compound containing lithium and nickel. As a typical example of a phosphate compound, a phosphate compound having an olivine structure can be given. In the first region 102, the phosphate compound containing lithium and nickel may include a region having an olivine structure. The first region 102 may have a single crystal structure, a polycrystalline structure, or a microcrystalline structure. Alternatively, the first region 102 may have an amorphous structure.

In the case where the first region 102 is formed using a phosphate compound including a region having an olivine structure, the first region 102 includes lithium, a transition metal, and phosphate ($PO_4$). As the transition metal, the one containing nickel and one or more of iron, manganese, cobalt, and nickel can be given. When the first region 102 includes nickel having a high oxidation-reduction potential, a high discharge potential is realized. Further, the higher the proportion of nickel in the first region 102 is, the higher the proportion of discharge capacity due to oxidation-reduction of nickel becomes, so that high energy density can be realized.

In the case where the first region 102 is formed using a phosphate compound containing lithium and nickel and including a region having an olivine structure, the first region 102 may include a substance expressed by a general formula, $Li_{1-x1}Ni_yM_{1-y}PO_4$ (x1 is larger than or equal to 0 and smaller than or equal to 1; and M is one or more of Fe, Mn, and Co). In the formula, y is made larger than 0 and smaller than or equal to 1, preferably larger than or equal to 0.8, more preferably 1, whereby higher energy density can be realized.

The first region 102 may have a concentration gradient of nickel.

The second region 104 may be formed using a phosphate compound containing lithium and one or more of iron, manganese, and cobalt, but not containing nickel. As a typical example of a phosphate compound, a phosphate compound having an olivine structure can be given. In the second region 104, the phosphate compound containing lithium and one or more of iron, manganese, and cobalt, but not containing nickel may include a region having an olivine structure. The second region 104 may have a single crystal structure, a polycrystalline structure, or a microcrystalline structure. Alternatively, the second region 104 may have an amorphous structure.

In the case where the second region 104 is formed using a phosphate compound including a region having an olivine structure, the second region 104 includes lithium, a transition metal, and phosphate ($PO_4$). As the transition metal, the one containing one or more of iron, manganese, and cobalt, but not containing nickel can be given.

In the case where the second region 104 is formed using a phosphate compound including a region having an olivine structure and containing lithium and one or more of iron, manganese, and cobalt, but not containing nickel, the second region 104 may include a substance expressed by a general formula, $Li_{1-x2}MePO_4$ (x2 is larger than or equal to 0 and smaller than or equal to 1; and Me is one or more of Fe, Mn, and Co).

The second region 104 is preferably formed using a compound functioning as a positive electrode active material which contributes to charge and discharge, in order not to lead to a reduction in capacity. In the case where the second region 104 is formed using a phosphate compound including a region having an olivine structure, high capacity can be realized in charge and discharge.

Since the second region 104 does not contain nickel, a discharge potential is decreased and energy density is reduced. Therefore, the smaller the ratio c of the thickness d of the second region 104 to the thickness r of the positive electrode active material layer 201 (c=d/r) is, the better. The ratio c is preferably larger than or equal to 0.005 and smaller than or equal to 0.25, more preferably larger than or equal to 0.01 and smaller than or equal to 0.1. By changing the ratio c, a positive electrode active material having desired energy density can be formed.

Lithium is extracted from and inserted into the compounds in the first region 102 and the second region 104 at the time of charge and discharge. Therefore, in the general formula, $Li_{1-x1}Ni_yM_{1-y}PO_4$ (x1 is larger than or equal to 0 and smaller than or equal to 1; M is one or more of Fe, Mn, and Co; and y is larger than 0 and smaller than or equal to 1), and in the general formula, $Li_{1-x2}MePO_4$ (x2 is larger than or equal to 0 and smaller than or equal to 1; and Me is one or more of Fe, Mn, and Co), x1 and x2 are each a given value in the range of 0 to 1. In some cases, the first region 102 and the second region 104 each have a concentration gradient of lithium.

For the compounds in the first region 102 and the second region 104, an alkali metal (e.g., sodium (Na) or potassium (K)), an alkaline earth metal (e.g., calcium (Ca), strontium (Sr), or barium (Ba)), beryllium (Be), or magnesium (Mg) can be used instead of lithium. Alternatively, for the compounds in the first region 102 and the second region 104, a compound containing lithium and one or more of an alkali metal and an alkaline earth metal can be used.

According to this embodiment, nickel is not in contact with the electrolyte solution; thus, generation of a catalyst effect of nickel can be suppressed, and a high discharge potential can be utilized.

Embodiment 2

In this embodiment, a structure of a positive electrode included in a power storage device according to one embodiment of the present invention, which is a different example from the example illustrated in FIG. 1, will be described with reference to FIG. 2, FIG. 3, and FIG. 4.

Figure 2:
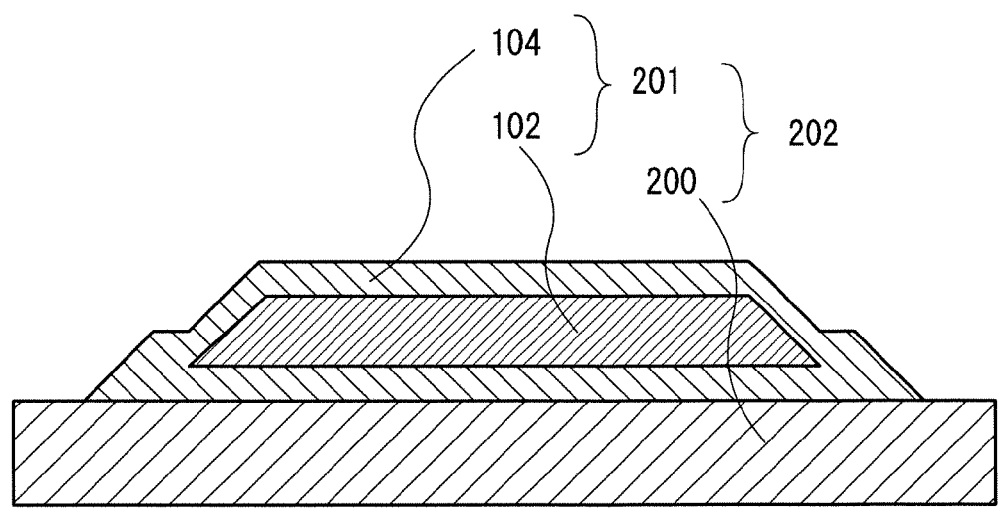
FIG. 2 illustrates one example of a cross-sectional view of a positive electrode including a positive electrode active material.
Figure 3:
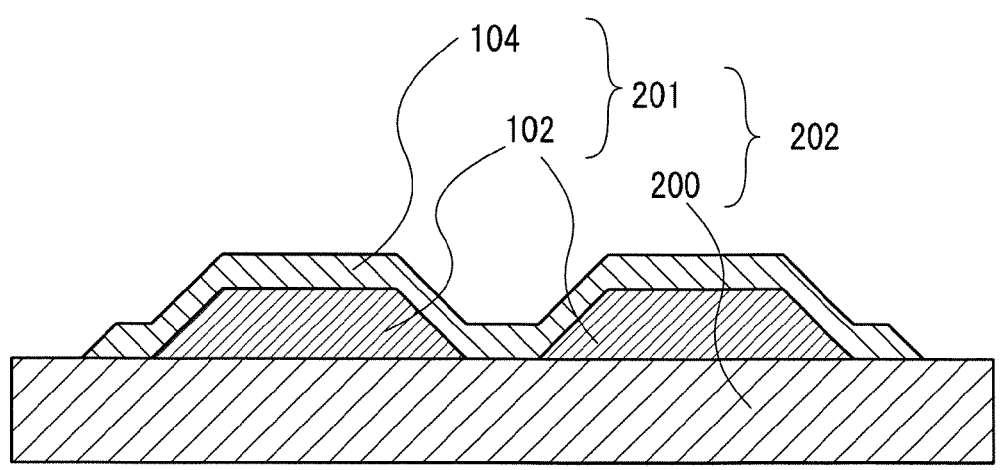
FIG. 3 illustrates one example of a cross-sectional view of a positive electrode including a positive electrode active material.
Figure 4:
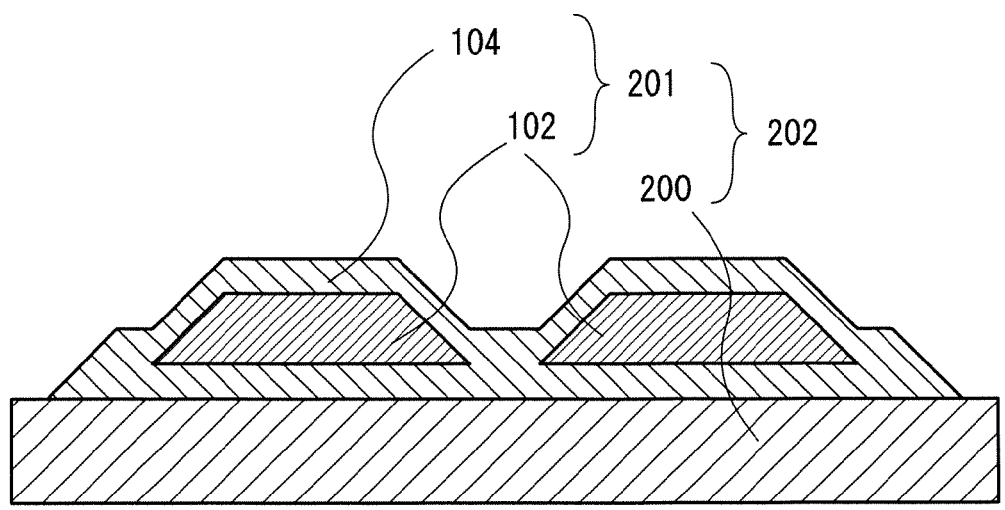
FIG. 4 illustrates one example of a cross-sectional view of a positive electrode including a positive electrode active material.

FIG. 2, FIG. 3, and FIG. 4 are each a schematic cross-sectional view of a positive electrode included in a power storage device which is one embodiment of the present invention.

As illustrated in FIG. 2, in this embodiment, the positive electrode active material layer 201 includes the film-form first region 102 which includes a compound containing lithium and nickel; and the film-form second region 104 which includes a compound containing lithium and one or more of iron, manganese, and cobalt, but not containing nickel. The first region 102 is covered with the second region 104. A top surface and a side surface of the first region 102 are covered with the second region 104. In addition, the second region 104 is formed between the first region 102 and a positive electrode current collector 200.

FIG. 3 and FIG. 4 each show the case where a plurality of the film-form first regions 102 are provided while FIG. 1 and FIG. 2 each show the case where one first region 102 is provided.

The other structures can be similar to those in Embodiment 1.

Embodiment 3

In this embodiment, a method for forming a positive electrode included in a power storage device which is one embodiment of the present invention will be described below.

Figure 5A:
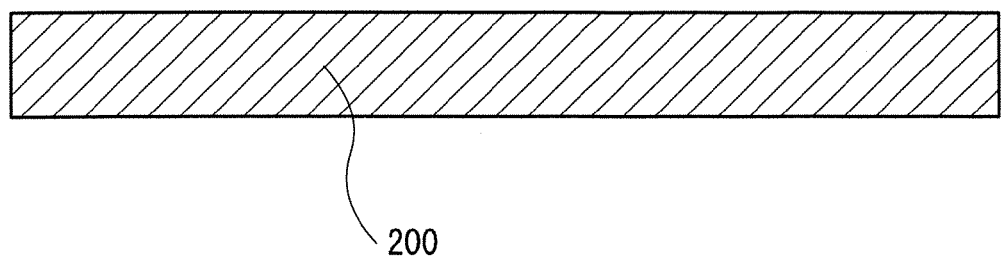
FIGS. 5A to 5C illustrate one example of a method for forming a positive electrode including a positive electrode active material.

First, the positive electrode current collector 200 is prepared (FIG. 5A).

There is no particular limitation on a material used for the positive electrode current collector 200; however, a material having high conductivity such as platinum, aluminum, copper, or titanium can be used. In this embodiment, titanium is used.

Figure 5B:
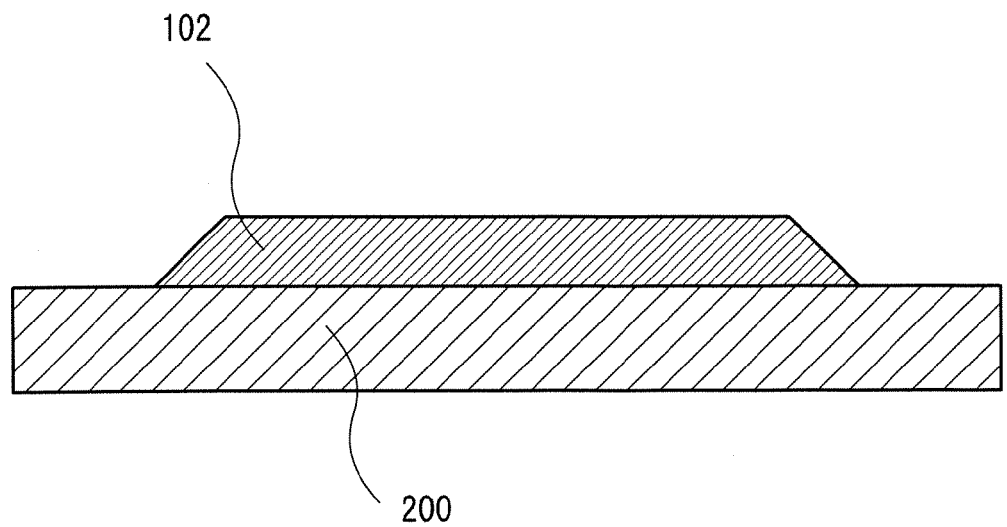

Next, over the positive electrode current collector 200, the first region 102 is formed using a compound containing lithium and nickel (FIG. 5B).

As a method for forming the first region 102 including the compound containing lithium and nickel, a dry process such as a PVD method (e.g., a sputtering method), a vacuum evaporation method, or a CVD method (e.g., a plasma CVD method, a thermal CVD method, or an LPCVD method) can be used. By forming the first region 102 including the compound containing lithium and nickel through a dry process, the first region 102 including the compound containing lithium and nickel can be uniform and thin. Therefore, the charge and discharge characteristics of the positive electrode can be stabilized.

In this embodiment, the first region 102 including, for example, a phosphate compound is formed by a sputtering method. For example, a phosphate compound having a thickness of 10 nm to 3 μm is formed with the use of a target including a substance expressed by a general formula, $LiNi_yM_{1-y}PO_4$ (M is one or more of Fe, Mn, and Co; and y is larger than 0 and smaller than or equal to 1).

The first region 102 is formed over part of the positive electrode current collector 200. The first region 102 is provided so that an end portion of the first region 102 is positioned inside an end portion of the positive electrode current collector 200. In the case where a sputtering method is employed, deposition is performed with the use of a metal mask or the like so that the first region 102 is not provided over the end portion of the positive electrode current collector 200. Alternatively, after a film to be the first region 102 is formed over the positive electrode current collector 200, an unnecessary portion is removed by etching.

Note that heat treatment may be performed after the first region 102 is formed. For example, the first region 102 can be crystallized through heat treatment. Alternatively, the crystallinity can be improved.

The temperature of the heat treatment is preferably higher than or equal to 450° C. and lower than or equal to 700° C. The length of time of the heat treatment is longer than or equal to 30 minutes and shorter than or equal to 40 hours, preferably longer than or equal to 2 hours and shorter than or equal to 10 hours. The atmosphere of the heat treatment is preferably a rare gas atmosphere, a nitrogen atmosphere, or the like. For example, the heat treatment can be performed at 600° C. for 4 hours in a nitrogen atmosphere.

Figure 5C:
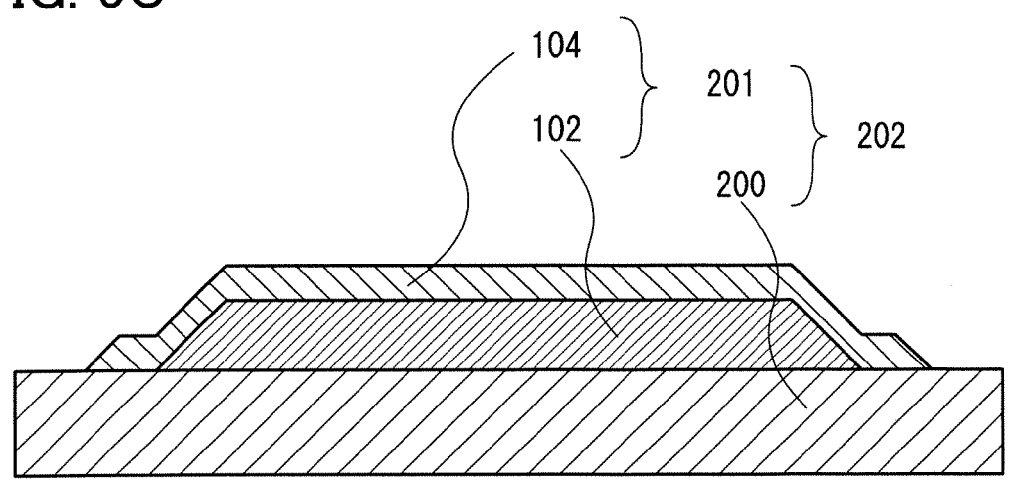

Next, over the positive electrode current collector 200 provided with the first region 102, the second region 104 is formed using a compound containing lithium and one or more of iron, manganese, and cobalt, but not containing nickel (FIG. 5C).

As a method for forming the second region 104 which includes the compound containing lithium and one or more of iron, manganese, and cobalt, but not containing nickel, a dry process such as a PVD method (e.g., a sputtering method), a vacuum evaporation method, or a CVD method (e.g., a plasma CVD method, a thermal CVD method, or an LPCVD method) can be used. By forming the second region 104 including the compound containing lithium and one or more of iron, manganese, and cobalt, but not containing nickel through a dry process, the second region 104 including the compound containing lithium and one or more of iron, manganese, and cobalt, but not containing nickel can be uniform and thin. Therefore, the charge and discharge characteristics of the positive electrode can be stabilized.

In this embodiment, the second region 104 including, for example, a phosphate compound is formed by a sputtering method. For example, a phosphate compound having a thickness of 10 nm to 3 μm is formed with the use of a target including a substance expressed by a general formula, $LiMePO_4$ (Me is one or more of Fe, Mn, and Co).

The second region 104 is preferably formed using a compound functioning as a positive electrode active material which contributes to charge and discharge, in order not to lead to a reduction in capacity. In the case where the second region 104 is formed using a phosphate compound including a region having an olivine structure, high capacity can be realized in charge and discharge.

Since the second region 104 does not contain nickel, a discharge potential is decreased and energy density is reduced. Therefore, the smaller the ratio c of the thickness d of the second region 104 to the thickness r of the positive electrode active material layer 201 (c=d/r) is, the better. The ratio c is preferably larger than or equal to 0.005 and smaller than or equal to 0.25, more preferably larger than or equal to 0.01 and smaller than or equal to 0.1. By changing the ratio c, a positive electrode active material having desired energy density can be formed.

The second region 104 is formed so as to cover a top surface and a side surface of the first region 102. Since the second region 104 covers the top surface and the side surface of the first region 102, the surfaces of the first region 102 are not exposed. With such a structure, in the case where the positive electrode is used for a power storage device, nickel in the first region is not in contact with an electrolyte solution; thus, generation of a catalyst effect of nickel can be suppressed and a high discharge potential of nickel can be utilized.

In this specification, the first region 102 and the second region 104 are collectively referred to as the positive electrode active material layer 201. Further, the positive electrode active material layer 201 and the positive electrode current collector 200 over which the positive electrode active material layer 201 is formed are collectively referred to as a positive electrode 202.

Note that heat treatment may be performed after the second region 104 is formed. For example, the positive electrode active material layer 201 including the first region 102 and the second region 104 can be crystallized through heat treatment. Alternatively, the crystallinity can be improved.

The temperature of the heat treatment is preferably higher than or equal to 450° C. and lower than or equal to 700° C. The length of time of the heat treatment is longer than or equal to 30 minutes and shorter than or equal to 40 hours, preferably longer than or equal to 2 hours and shorter than or equal to 10 hours. The atmosphere of the heat treatment is preferably a rare gas atmosphere, a nitrogen atmosphere, or the like. For example, the heat treatment can be performed at 600° C. for 4 hours in a nitrogen atmosphere.

A covering film may be formed on the surface of the positive electrode active material layer 201 with the use of carbon or the like. A dry process such as a PVD method (e.g., a sputtering method), a vacuum evaporation method, or a CVD method (e.g., a plasma CVD method, a thermal CVD method, or an LPCVD method) can be employed. Alternatively, a wet process such as a coating method may be employed. Heat treatment may be performed after the covering film is formed (not illustrated).

Note that the "active material" refers to a material that relates to insertion and extraction of ions which function as carriers and does not include a covering film including carbon or the like.

Through the above steps, the positive electrode 202 including the positive electrode active material layer 201 is formed.

According to this embodiment, a positive electrode including a positive electrode active material that can suppress generation of a catalyst effect of nickel and utilize a high discharge potential of nickel can be formed.

Embodiment 4

A lithium-ion secondary battery will be described below as one example of a power storage device including a positive electrode which includes a positive electrode active material and is obtained through the above steps. The schematic structure of the lithium-ion secondary battery is illustrated in FIG. 6.

Figure 6:
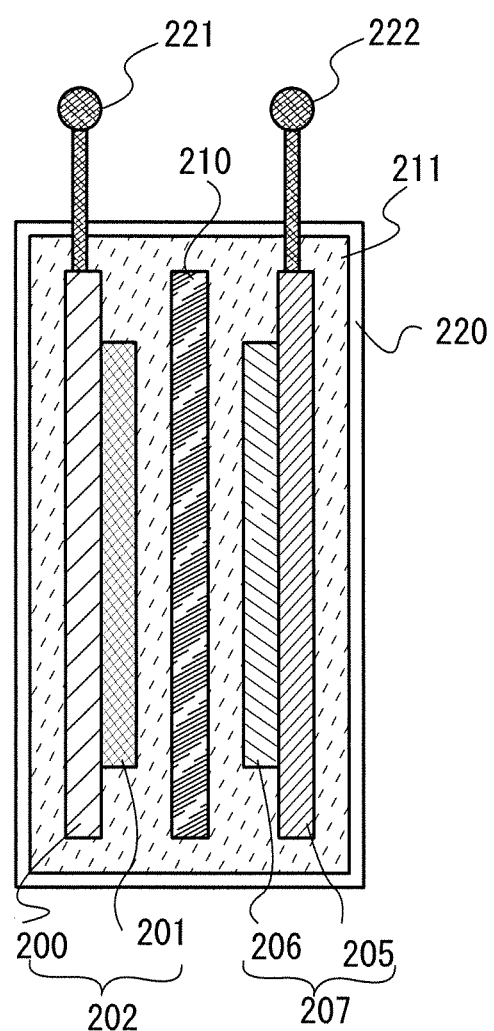
FIG. 6 illustrates one example of a cross-sectional view of a power storage device.

In the lithium-ion secondary battery illustrated in FIG. 6, the positive electrode 202, a negative electrode 207, and a separator 210 are provided in a housing 220 which is isolated from the outside, and an electrolyte solution 211 is filled in the housing 220. In addition, the separator 210 is provided between the positive electrode 202 and the negative electrode 207.

The positive electrode active material layer 201 is formed in contact with the positive electrode current collector 200. On the other hand, a negative electrode active material layer 206 is formed in contact with a negative electrode current collector 205. In this specification, the positive electrode active material layer 201 and the positive electrode current collector 200 over which the positive electrode active material layer 201 is formed are collectively referred to as the positive electrode 202. The negative electrode active material layer 206 and the negative electrode current collector 205 over which the negative electrode active material layer 206 is formed are collectively referred to as the negative electrode 207. As the positive electrode 202, the positive electrode 202 formed in any of Embodiments I to 3 is used.

A first electrode 221 and a second electrode 222 are connected to the positive electrode current collector 200 and the negative electrode current collector 205, respectively, and charge and discharge are performed through the first electrode 221 and the second electrode 222.

Moreover, there are certain gaps between the positive electrode active material layer 201 and the separator 210 and between the negative electrode active material layer 206 and the separator 210. However, the structure is not particularly limited thereto; the positive electrode active material layer 201 may be in contact with the separator 210, and the negative electrode active material layer 206 may be in contact with the separator 210. Further, the lithium-ion secondary battery may be rolled into a cylinder shape with the separator 210 interposed between the positive electrode 202 and the negative electrode 207.

As the positive electrode current collector 200, a material having high conductivity such as aluminum or stainless steel can be used. The positive electrode current collector 200 can have a foil shape, a plate shape, a thin-film shape formed over an insulating substrate such as a glass substrate, or the like as appropriate.

As the thickness of the positive electrode active material layer 201, a desired thickness is selected from the range of 20 nm to 6 μm. It is preferable to adjust the thickness of the positive electrode active material layer 201 as appropriate so that cracks and separation do not occur. Further, it is preferable that cracks and separation be made not to occur on the positive electrode active material layer 201 not only when the positive electrode current collector is flat but also when the positive electrode current collector is rolled into a cylinder shape, though it depends on the form of the lithium-ion secondary battery.

As the negative electrode current collector 205, a material having high conductivity such as copper, stainless steel, or iron can be used.

As the negative electrode active material layer 206, lithium, aluminum, graphite, silicon, germanium, or the like is used. The negative electrode active material layer 206 may be formed over the negative electrode current collector 205 by a coating method, a sputtering method, an evaporation method, or the like. Note that it is possible to omit the negative electrode current collector 205 and use any one of the materials alone as the negative electrode active material layer 206. The theoretical lithium insertion capacities are each larger in germanium, silicon, lithium, and aluminum than that in graphite. When the insertion capacity is large, charge and discharge can be performed sufficiently even in a small area and a function as a negative electrode can be obtained; therefore, cost reduction and miniaturization of a secondary battery can be realized. However, countermeasures against deterioration are needed because there are the following problems: in the case of silicon or the like, the volume is increased up to approximately fourth times as large as the volume before lithium insertion so that the material itself becomes vulnerable, and a reduction in charge and discharge capacity due to repetition of charge and discharge (i.e., cycle deterioration) becomes remarkable.

The electrolyte solution contains alkali metal ions which are carrier ions, and these ions are responsible for electrical conduction. As an example of the alkali metal ion, a lithium ion is given, for example.

The electrolyte solution 211 includes, for example, a solvent and a lithium salt dissolved in the solvent. Examples of the lithium salts include lithium chloride (LiCl), lithium fluoride (LiF), lithium perchlorate ($LiClO_4$), lithium fluoroborate ($LiBF_4$), $LiAsF_6$, $LiPF_6$, $Li(C_2F_5SO_2)_2N$, and the like.

Examples of the solvent for the electrolyte solution 211 include cyclic carbonates (e.g., ethylene carbonate (hereinafter abbreviated to EC), propylene carbonate (PC), butylene carbonate (BC), and vinylene carbonate (VC)); acyclic carbonates (e.g., dimethyl carbonate (DMC), diethyl carbonate (DEC), ethylmethyl carbonate (EMC), methylpropyl carbonate (MPC), methylisobutyl carbonate (MIBC), and dipropyl carbonate (DPC)); aliphatic carboxylic acid esters (e.g., methyl formate, methyl acetate, methyl propionate, and ethyl propionate); acyclic ethers (e.g., 1,2-dimethoxyethane (DME), 1,2-diethoxyethane (DEE), ethoxymethoxy ethane (EME), and γ-lactones such as γ-butyrolactone); cyclic ethers (e.g., tetrahydrofuran and 2-methyltetrahydrofuran); cyclic sulfones (e.g., sulfolane); alkyl phosphate ester (e.g., dimethylsulfoxide and 1,3-dioxolane, and trimethyl phosphate, triethyl phosphate, and trioctyl phosphate); and fluorides thereof. All of the above solvents can be used either alone or in combination as the electrolyte solution 211.

As the separator 210, paper, nonwoven fabric, a glass fiber, a synthetic fiber such as nylon (polyamide), vinylon (also called vinalon) (a polyvinyl alcohol based fiber), polyester, acrylic, polyolefin, or polyurethane, or the like may be used. However, a material which does not dissolve in the above-described electrolyte solution 211, should be selected.

More specific examples of materials for the separator 210 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, all of which can be used either alone or in combination.

A solid electrolyte may be used instead of the electrolyte solution 211 and the separator 210. In the case where a solid electrolyte is used, the positive electrode active material layer 201 and the negative electrode active material layer 206 are made to face each other with the solid electrolyte interposed therebetween, and the positive electrode active material layer 201 and the solid electrolyte are made to be in close contact with each other and the negative electrode active material layer 206 and the solid electrolyte are made to be in close contact with each other.

When charge of the lithium-ion secondary battery described above is performed, a positive electrode terminal is connected to the first electrode 221 and a negative electrode terminal is connected to the second electrode 222. An electron is taken away from the positive electrode 202 through the first electrode 221 and transferred to the negative electrode 207 through the second electrode 222. In addition, a lithium ion is eluted from the positive electrode active material layer 201 from the positive electrode, reaches the negative electrode 207 through the separator 210, and is taken in the negative electrode active material in the negative electrode active material layer 206. At the same time, in the positive electrode active material layer 201, an electron is released, and an oxidation reaction of a transition metal (one or more of iron, manganese, cobalt, and nickel) contained in the positive electrode active material layer 201 occurs.

At the time of discharge, in the negative electrode 207, the negative electrode active material layer 206 releases lithium as an ion, and an electron is transferred to the second electrode 222. The lithium ion passes through the separator 210, reaches the positive electrode active material layer 201, and is taken in the positive electrode active material layer 201. At that time, an electron from the negative electrode 207 also reaches the positive electrode 202, and a reduction reaction of the transition metal (one or more of iron, manganese, cobalt, and nickel) contained in the positive electrode active material layer 201 occurs.

The smaller the ratio c of the thickness d of the second region 104 to the thickness r of the positive electrode active material layer 201 ($c=d/r$) is, the larger the energy density obtained in this embodiment becomes. The ratio c is preferably larger than or equal to 0.005 and smaller than or equal to 0.25, more preferably larger than or equal to 0.01 and smaller than or equal to 0.1. By changing the ratio c, a positive electrode active material having desired energy density can be formed.

The lithium-ion secondary battery manufactured in the above manner includes a compound containing nickel as the positive electrode active material. Since nickel is contained in the positive electrode active material, a high discharge potential is realized. For example, there is a difference between positive electrode active materials having an olivine structure and containing different transition metals; however, the theoretical capacities per unit weight of the active material are almost the same. Therefore, the higher the discharge potential is, the more likely high energy density is to be realized.

For the organic solvent used in the electrolyte solution, a material having a wide potential window, that is, a material having a large difference between the oxidation potential and the reduction potential should be selected. The reason of this is as follows: in the case where an organic solvent having a small difference between the oxidation potential and the reduction potential is used, an oxidation-reduction reaction of the organic solvent is started and the organic solvent is decomposed before the potential reaches a potential at which insertion and extraction of a lithium ion are possible, so that insertion and extraction of a lithium ion cannot be performed. Note that the oxidation potential and the reduction potential of the electrolyte solution can be confirmed by a cyclic voltammetry method or the like. It is necessary to use an organic solvent whose potential window is wider than the width of the charge and discharge potential expected in the case of using a positive electrode active material including a compound containing lithium and nickel.

However, when a battery is manufactured with the use of a positive electrode material including a compound containing lithium and nickel and with the use of an organic solvent whose potential window is wider than the width of the charge and discharge potential expected in the case of using the positive electrode active material including the compound containing lithium and nickel, charge and discharge cannot be performed because a catalyst effect of nickel causes the decomposition of the solvent before the potential reaches the expected value.

In this embodiment, the positive electrode 202 includes the positive electrode active material layer 201 in which a region on the side in contact with the electrolyte solution is formed of the second region 104 including a compound containing lithium and one or more of iron, manganese, and cobalt, but not containing nickel, and the first region 102 including a compound containing lithium and nickel is not in contact with the electrolyte solution. With the use of such a positive electrode 202, a catalyst effect of nickel can be suppressed and charge and discharge are possible. Accordingly, the energy density can be increased.

Embodiment 5

In this embodiment, an application example of the power storage device described in Embodiment 4 will be described.

The power storage device described in Embodiment 4 can be used in electronic devices such as cameras like digital cameras or video cameras, digital photo frames, mobile phones (also referred to as cellular phones or cellular phone devices), portable game machines, portable information terminals, and audio reproducing devices. Further, the power storage device can be used in electric propulsion vehicles such as electric vehicles, hybrid vehicles, train vehicles, maintenance vehicles, carts, wheelchairs, and bicycles.

Figure 7:
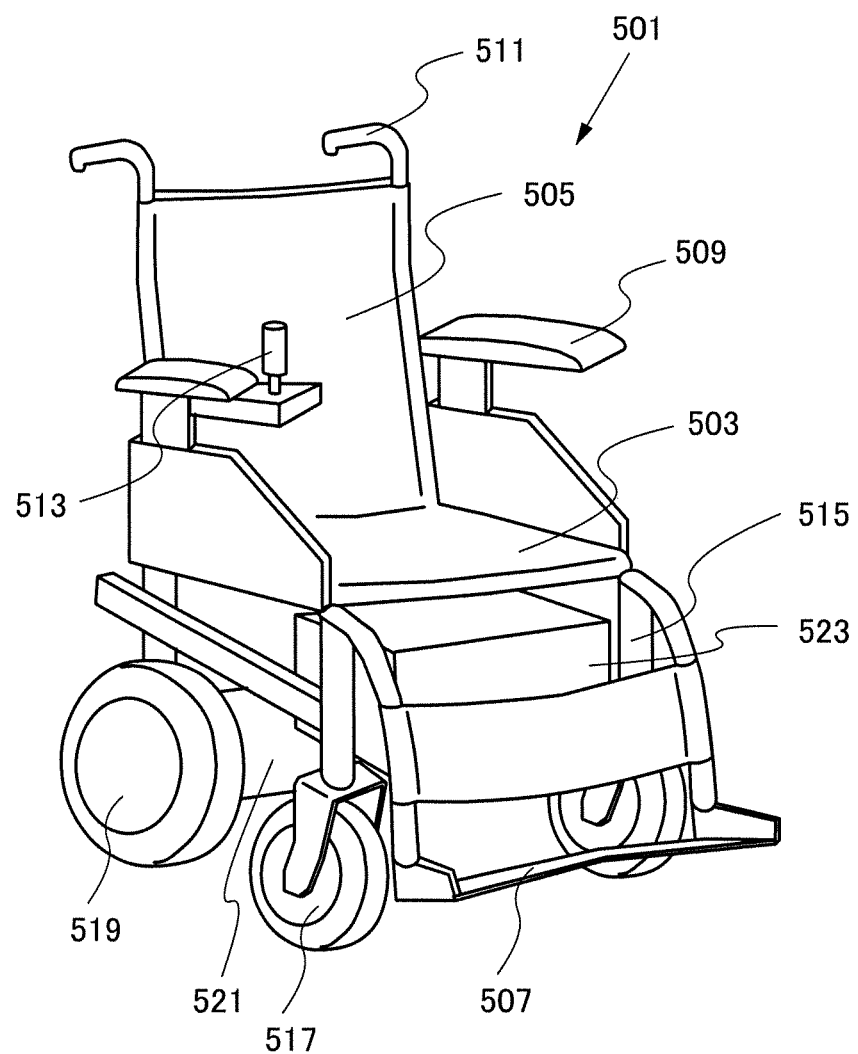
FIG. 7 is a perspective view for illustrating one example of an application mode of a power storage device.

FIG. 7 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. A pair of front wheels 517 is provided at the front of and below the seat 503 through a frame 515 provided below the seat 503, and a pair of rear wheels 519 is provided behind and below the seat 503. The rear wheels 519 are connected to a driving portion 521 having a motor, a brake, a gear, and the like. A control portion 523 including a battery, a power controller, a control means, and the like is provided under the seat 503. The control portion 523 is connected to the controller 513 and the driving portion 521. The driving portion 521 is driven through the control portion 523 with the operation of the controller 513 by the user and the control portion 523 controls the operation of moving forward, moving back, turning around, and the like, and the speed of the electric wheelchair 501.

The power storage device described in Embodiment 4 can be used in the battery of the control portion 523. The battery of the control portion 523 can be externally charged by electric power supply using a plug-in system.

Figure 8:
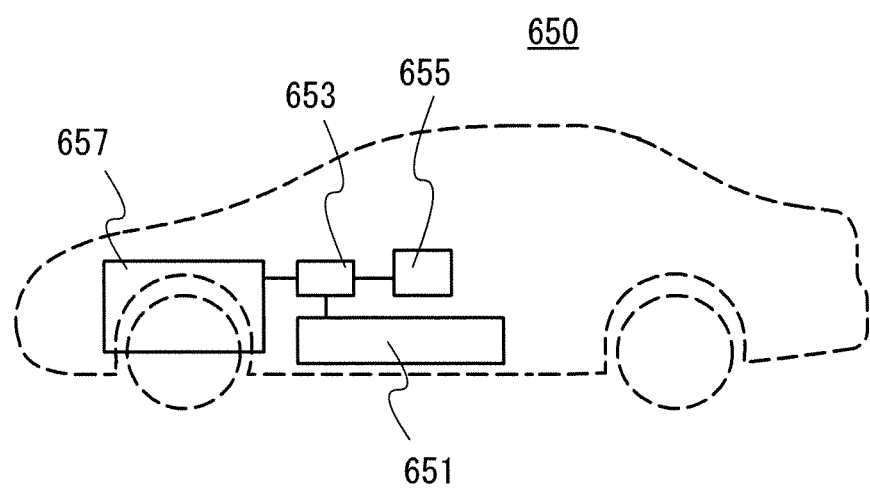
FIG. 8 illustrates one example of an application mode of a power storage device.

FIG. 8 illustrates an example of an electric vehicle. A power storage device 651 is provided in an electric vehicle 650. The output of the electric power of the power storage device 651 is controlled by a control circuit 653 and the electric power is supplied to a driving device 657. The control circuit 653 is controlled by a computer 655.

The driving device 657 includes a DC motor or an AC motor either alone or in combination with an internal-combustion engine. The computer 655 outputs a control signal to the control circuit 653 in response to input data such as data of a driver's operation (e.g., acceleration, deceleration, or stop) and data during driving (e.g., data of an upgrade or a downgrade or data of a load on a driving wheel) of the electric vehicle 650. The control circuit 653 adjusts the electric energy supplied from the power storage device 651 in response to the control signal of the computer 655 to control the output of the driving device 657. In the case where the AC motor is mounted, an inverter which converts direct current into alternate current is incorporated.

The power storage device described in Embodiment 4 can be used in the battery of the power storage device 651. The power storage device 651 can be externally charged by electric power supply using a plug-in system.

Note that in the case where the electric propulsion vehicle is a train vehicle, the train vehicle can be charged by electric power supply from an overhead cable or a conductor rail.

Embodiment 6

In this embodiment, an example in which the power storage device according to one embodiment of the present invention is used in a wireless power feeding system (hereinafter referred to as an RF power feeding system) will be described with reference to block diagrams in FIG. 9 and FIG. 10. In each of the block diagrams, independent blocks show elements within a power receiving device and a power feeding device, which are classified according to their functions. However, it may be practically difficult to completely separate the elements according to their functions; in some cases, one element can involve a plurality of functions.

First, the RF power feeding system is described with reference to FIG. 9.

A power receiving device 800 is an electronic device or an electric propulsion vehicle which is driven by electric power supplied from a power feeding device 900, and can be applied to another device which is driven by electric power, as appropriate. Typical examples of the electronic device include cameras such as digital cameras or video cameras, digital photo frames, mobile phones (also referred to as cellular phones or cellular phone devices), portable game machines, portable information terminals, audio reproducing devices, display devices, computers, and the like. Typical examples of the electric propulsion vehicles include electric vehicles, hybrid vehicles, train vehicles, maintenance vehicles, carts, wheelchairs, and the like. In addition, the power feeding device 900 has a function of supplying electric power to the power receiving device 800.

Figure 9:
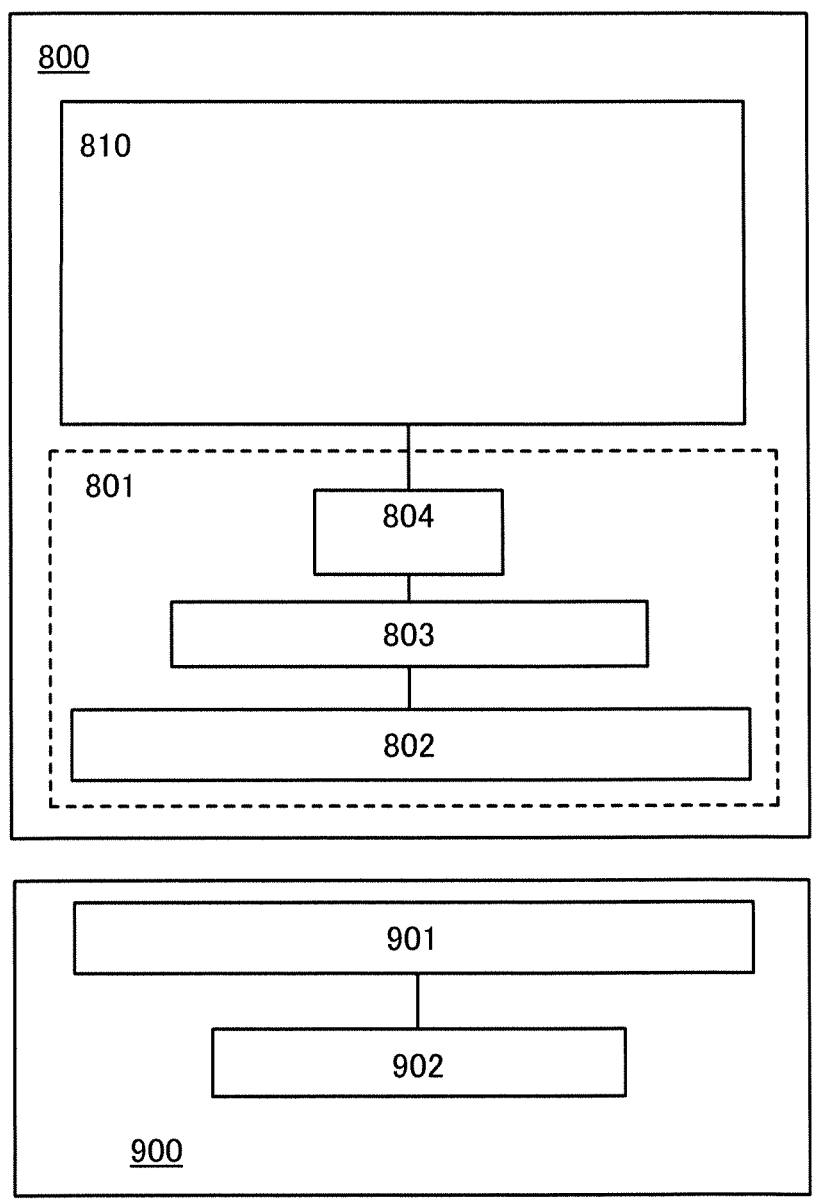
FIG. 9 illustrates one example of a structure of a wireless power feeding system.

In FIG. 9, the power receiving device 800 includes a power receiving device portion 801 and a power load portion 810. The power receiving device portion 801 includes at least a power receiving device antenna circuit 802, a signal processing circuit 803, and a power storage device 804. The power feeding device 900 includes a power feeding device antenna circuit 901 and a signal processing circuit 902.

The power receiving device antenna circuit 802 has a function of receiving a signal transmitted by the power feeding device antenna circuit 901 or transmitting a signal to the power feeding device antenna circuit 901. The signal processing circuit 803 processes a signal received by the power receiving device antenna circuit 802 and controls charging of the power storage device 804 and supplying of electric power from the power storage device 804 to the power load portion 810. The power load portion 810 is a driving portion which receives electric power from the power storage device 804 and drives the power receiving device 800. Typical examples of the power load portion 810 include a motor, a driving circuit, and the like. Another power load portion can be alternatively used as appropriate. The power feeding device antenna circuit 901 has a function of transmitting a signal to the power receiving device antenna circuit 802 or receiving a signal from the power receiving device antenna circuit 802. The signal processing circuit 902 controls operation of the power feeding device antenna circuit 901. That is, the signal processing circuit 902 can control the intensity, the frequency, or the like of a signal transmitted by the power feeding device antenna circuit 901.

The power storage device according to one embodiment of the present invention is used as the power storage device 804 included in the power receiving device 800 in the RF power feeding system.

With the use of the power storage device according to one embodiment of the present invention in the RF power feeding system, the amount of power storage can be larger than that in a conventional power storage device. Therefore, the time interval of the wireless power feeding can be longer (frequent power feeding is not needed).

In addition, with the use of the power storage device according to one embodiment of the present invention in the RF power feeding system, the power receiving device 800 can be formed to be compact and lightweight if the amount of power storage with which the power load portion 810 can be driven is the same as that in a conventional power storage device. Therefore, the total cost can be reduced.

Next, another example of the RF power feeding system is described with reference to FIG. 10.

Figure 10:
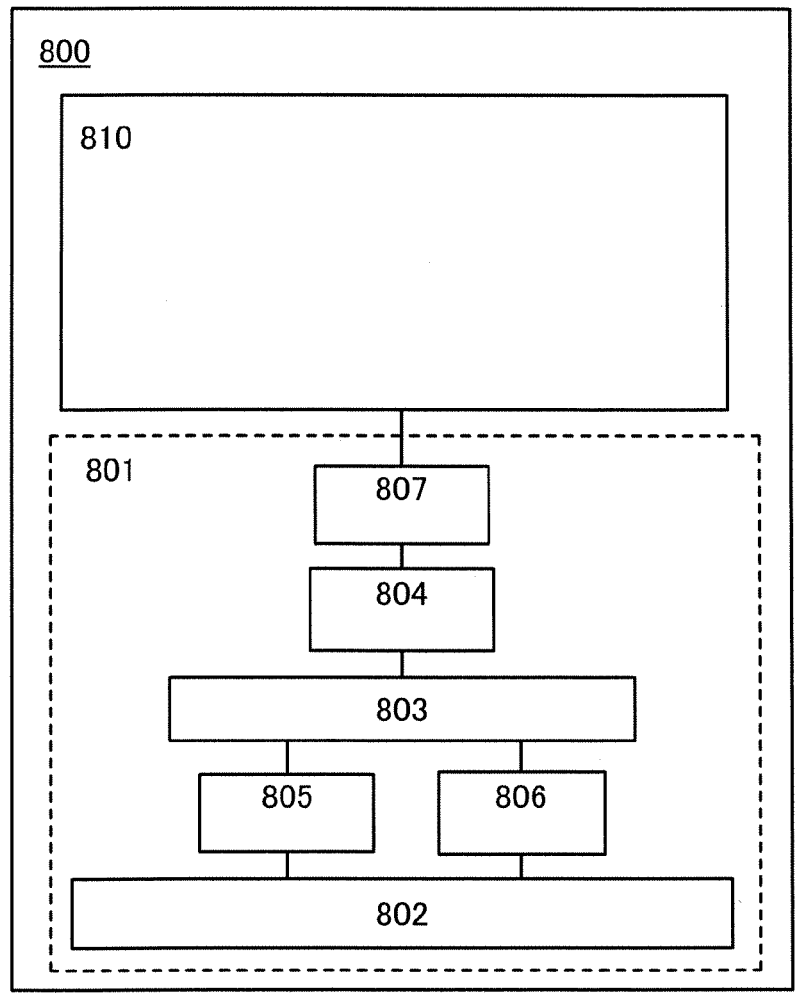
FIG. 10 illustrates one example of a structure of a wireless power feeding system.
Figure 10:
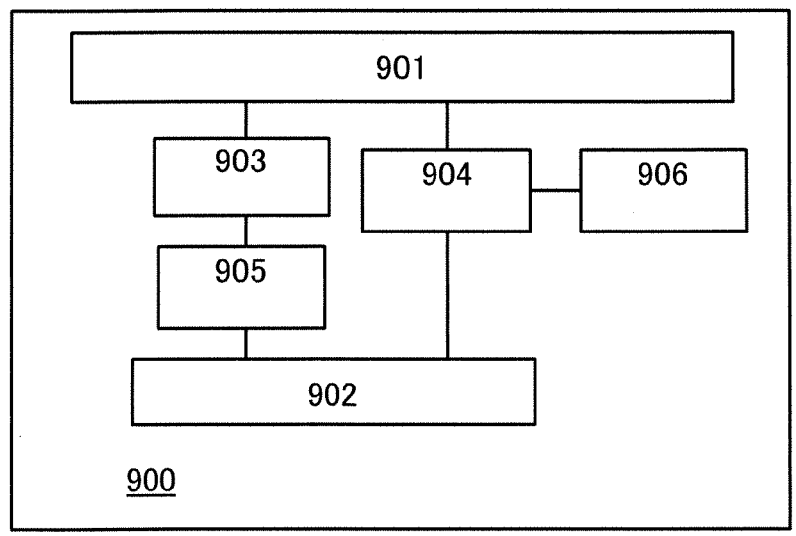

In FIG. 10, the power receiving device 800 includes the power receiving device portion 801 and the power load portion 810. The power receiving device portion 801 includes at least the power receiving device antenna circuit 802, the signal processing circuit 803, the power storage device 804, a rectifier circuit 805, a modulation circuit 806, and a power supply circuit 807. In addition, the power feeding device 900 includes at least the power feeding device antenna circuit 901, the signal processing circuit 902, a rectifier circuit 903, a modulation circuit 904, a demodulation circuit 905, and an oscillator circuit 906.

The power receiving device antenna circuit 802 has a function of receiving a signal transmitted by the power feeding device antenna circuit 901 or transmitting a signal to the power feeding device antenna circuit 901. When the power receiving device antenna circuit 802 receives a signal transmitted by the power feeding device antenna circuit 901, the rectifier circuit 805 has a function of generating DC voltage from the signal received by the power receiving device antenna circuit 802. The signal processing circuit 803 has a function of processing a signal received by the power receiving device antenna circuit 802 and controlling charging of the power storage device 804 and supplying of electric power from the power storage device 804 to the power supply circuit 807. The power supply circuit 807 has a function of converting voltage stored by the power storage device 804 into voltage needed for the power load portion. The modulation circuit 806 is used when a certain response is transmitted from the power receiving device 800 to the power feeding device 900.

With the power supply circuit 807, electric power supplied to the power load portion 810 can be controlled. Thus, overvoltage application to the power load portion 810 can be suppressed, and deterioration or breakdown of the power receiving device 800 can be reduced.

In addition, with the modulation circuit 806, a signal can be transmitted from the power receiving device 800 to the power feeding device 900. Therefore, when the amount of charged power in the power receiving device 800 is judged and the power receiving device 800 is charged with a certain amount of power, a signal is transmitted from the power receiving device 800 to the power feeding device 900 so that power feeding from the power feeding device 900 to the power receiving device 800 can be stopped. As a result, it is possible not to fully charge the power storage device 804, so that deterioration or breakdown of the power storage device 804 due to overcharge can be reduced and the number of charge times of the power storage device 804 can be increased.

The power feeding device antenna circuit 901 has a function of transmitting a signal to the power receiving device antenna circuit 802 or receiving a signal from the power receiving device antenna circuit 802. When a signal is transmitted to the power receiving device antenna circuit 802, the signal processing circuit 902 generates a signal which is transmitted to the power receiving device. The oscillator circuit 906 is a circuit which generates a signal with a certain frequency. The modulation circuit 904 has a function of applying voltage to the power feeding device antenna circuit 901 on the basis of a signal generated by the signal processing circuit 902 and a signal with a certain frequency generated by the oscillator circuit 906. Thus, a signal is output from the power feeding device antenna circuit 901. On the other hand, when reception of a signal from the power receiving device antenna circuit 802 is performed, the rectifier circuit 903 has a function of rectifying the received signal. From signals rectified by the rectifier circuit 903, the demodulation circuit 905 extracts a signal transmitted from the power receiving device 800 to the power feeding device 900. The signal processing circuit 902 has a function of analyzing the signal extracted by the demodulation circuit 905.

Note that any circuit may be provided between circuits as long as the RF power feeding can be performed. For example, after the power receiving device 800 receives electromagnetic waves and the rectifier circuit 805 generates DC voltage, constant voltage may be generated by a circuit such as a DC-DC converter or a regulator. Thus, overvoltage application to the inside of the power receiving device can be suppressed.

The power storage device according to one embodiment of the present invention is used as the power storage device 804 included in the power receiving device 800 in the RF power feeding system.

With the use of the power storage device according to one embodiment of the present invention in the RF power feeding system, the amount of power storage can be larger than that in a conventional power storage device. Therefore, the time interval of the wireless power feeding can be longer (frequent power feeding is not needed).

In addition, with the use of the power storage device according to one embodiment of the present invention in the RF power feeding system, the power receiving device 800 can be formed to be compact and lightweight if the amount of power storage with which the power load portion 810 can be driven is the same as that in a conventional power storage device. Therefore, the total cost can be reduced.

Note that when the power storage device according to one embodiment of the present invention is used in the RF power feeding system and the power receiving device antenna circuit 802 and the power storage device 804 overlap with each other, it is preferable that the impedance of the power receiving device antenna circuit 802 be not changed by deformation of the power storage device 804 due to charge and discharge of the power storage device 804. When the impedance of the antenna is changed, in some cases, electric power is not supplied sufficiently. For example, the power storage device 804 may be placed in a battery pack formed using metal or ceramics. Note that in that case, the power receiving device antenna circuit 802 and the battery pack are preferably separated from each other by several tens of micrometers Or more.

In this embodiment, the charging signal has no limitation on its frequency and may have any band of frequency as long as electric power can be transmitted. For example, the charging signal may have any of an LF band of 135 kHz (long wave), an HF band of 13.56 MHz, a UHF band of 900 MHz to 1 GHz, and a microwave band of 2.45 GHz.

A signal transmission method may be selected as appropriate from various methods including an electromagnetic coupling method, an electromagnetic induction method, a resonance method, and a microwave method. In one embodiment of the present invention, in order to prevent energy loss due to foreign substances containing moisture, such as rain and mud, the electromagnetic induction method or the resonance method using a low frequency band, more specifically, frequencies of a short wave of 3 MHz to 30 MHz, a medium wave of 300 kHz to 3 MHz, a long wave of 30 kHz to 300 kHz, or a very-low frequency wave of 3 kHz to 30 kHz, may be used.

This embodiment can be implemented in combination with any of the above embodiments.

This application is based on Japanese Patent Application serial no. 2010-122793 filed with Japan Patent Office on May 28, 2010, the entire contents of which are hereby incorporated by reference.

What is claimed is:

1. A power storage device comprising:
a positive electrode in which a positive electrode active material is formed over a positive electrode current collector; and
a negative electrode which faces the positive electrode with an electrolyte interposed between the negative electrode and the positive electrode,
wherein the positive electrode active material comprises:
   a first region comprising a compound containing lithium and nickel; and
   a second region comprising a compound containing lithium and one or more of iron, manganese, and cobalt, but not containing nickel,
wherein the first region is covered with the second region,
wherein the first region is in direct contact with a surface of the positive electrode current collector, and
wherein the second region is in direct contact with the surface of the positive electrode current collector.

2. The power storage device according to claim 1,
wherein a top surface and a side surface of the first region are covered with the second region.

3. A power storage device comprising:
a positive electrode in which a positive electrode active material is formed over a positive electrode current collector; and
a negative electrode which faces the positive electrode with an electrolyte interposed between the negative electrode and the positive electrode,
wherein the positive electrode active material comprises:
   a first region comprising a phosphate compound containing lithium and nickel; and
   a second region comprising a phosphate compound containing lithium and one or more of iron, manganese, and cobalt, but not containing nickel,
wherein the first region is covered with the second region,
wherein the first region is in direct contact with a surface of the positive electrode current collector, and
wherein the second region is in direct contact with the surface of the positive electrode current collector.

4. The power storage device according to claim 3,
wherein the phosphate compound containing lithium and nickel comprises an olivine structure.

5. The power storage device according claim 3,
wherein the phosphate compound containing lithium and one or more of iron, manganese, and cobalt, but not containing nickel comprises an olivine structure.

6. The power storage device according to claim 3,
wherein a top surface and a side surface of the first region are covered with the second region.

7. A power storage device comprising:
a positive electrode in which a positive electrode active material is formed over a positive electrode current collector; and
a negative electrode which faces the positive electrode with an electrolyte interposed between the negative electrode and the positive electrode,
wherein the positive electrode active material comprises:
   a plurality of first regions comprising a phosphate compound containing lithium and nickel; and
   a second region comprising a phosphate compound containing lithium and one or more of iron, manganese, and cobalt, but not containing nickel,
wherein the plurality of first regions are covered with the second region,
wherein the plurality of first regions are in direct contact with a surface of the positive electrode current collector, and
wherein the second region is in direct contact with the surface of the positive electrode current collector.

8. The power storage device according to claim 7,
wherein the phosphate compound containing lithium and nickel comprises an olivine structure.

9. The power storage device according claim 7,
wherein the phosphate compound containing lithium and one or more of iron, manganese, and cobalt, but not containing nickel comprises an olivine structure.

10. The power storage device according to claim 7,
wherein top surfaces and side surfaces of the plurality of first regions are covered with the second region.

* * * * *